United States Patent
Maeda

(10) Patent No.: US 11,956,393 B2
(45) Date of Patent: Apr. 9, 2024

(54) READING DEVICE, READING METHOD, AND COMPUTER-READABLE RECORDING MEDIUM

(71) Applicant: BROTHER KOGYO KABUSHIKI KAISHA, Nagoya (JP)

(72) Inventor: Takashi Maeda, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 299 days.

(21) Appl. No.: 17/551,559

(22) Filed: Dec. 15, 2021

(65) Prior Publication Data
US 2022/0210285 A1   Jun. 30, 2022

(30) Foreign Application Priority Data
Dec. 25, 2020   (JP) ................. 2020-217754

(51) Int. Cl.
*H04N 1/04*   (2006.01)
*H04N 1/00*   (2006.01)

(52) U.S. Cl.
CPC ..... *H04N 1/00737* (2013.01); *H04N 1/00708* (2013.01); *H04N 1/00748* (2013.01)

(58) Field of Classification Search
USPC ......................................... 358/497, 474, 494
See application file for complete search history.

(56) References Cited

U.S. PATENT DOCUMENTS

| | | | | |
|---|---|---|---|---|
| 2009/0296172 A1* | 12/2009 | Iwatsuka | ............... | H04N 1/484 |
| | | | | 358/509 |
| 2010/0073694 A1* | 3/2010 | Fujiwara | ................. | H04N 1/40 |
| | | | | 358/449 |
| 2015/0341509 A1 | 11/2015 | Yamada | | |
| 2016/0205280 A1* | 7/2016 | Kato | ....................... | H04N 1/10 |
| | | | | 358/1.12 |

FOREIGN PATENT DOCUMENTS

| | | | |
|---|---|---|---|
| JP | 2004-282517 A | 10/2004 | |
| JP | 2008-306366 A | 12/2008 | |
| JP | 2010-074753 A | 4/2010 | |
| JP | 2015-220659 A | 12/2015 | |

* cited by examiner

*Primary Examiner* — Cheukfan Lee
(74) *Attorney, Agent, or Firm* — Scully, Scott, Murphy & Presser, PC

(57) ABSTRACT

A reading device includes a reading sensor, a platen on which a first original and a second original being longer in a first direction can be placed, and a controller. the controller moves the reading sensor from an initial position to a standby position, causes the reading sensor to detect edges of the original while moving by a predetermined distance in the first direction, detect edges of the original while moving toward the initial position when a first edge in the first direction and a second edge in a second direction orthogonal to the first direction are detected or when neither of the edges are detected, detect edges while moving in a direction away from the initial position when the first edge is not detected and the second edge is detected, and acquire a content of the original while moving toward the initial position when the first edge is detected.

7 Claims, 12 Drawing Sheets

READING DEVICE, READING METHOD, AND COMPUTER-READABLE RECORDING MEDIUM

CROSS REFERENCE TO RELATED APPLICATIONS

This application claims priority under 35 U.S.C. § 119 from Japanese Patent Application No. 2020-217754 filed on Dec. 25, 2020. The entire subject matter of the application is incorporated herein by reference.

BACKGROUND

Aspects of the present disclosure relate to a reading device configured to read an original placed on a platen.

A technique is known in which a reading position of a reading mechanism for determining a reading target area in which an original is to be read is changed from a home position to a position corresponding to a designated sheet size.

SUMMARY

In the above-mentioned conventional technique, when a size of an original is designated, a reading position is changed to a position corresponding to the designated size, thereby reducing time required for a preliminary scanning for determining a reading target area. However, no consideration has been given to reducing the time required for the preliminary scanning when the size of the original is not designated.

According to aspects of the present disclosure, there is provided a reading device including a reading sensor configured to read an original, a platen on which the original is to be placed, and a controller. The platen is configured such that a first original and a second original longer in a first direction than the first original can be placed. The controller is configured to execute a moving process of moving the reading sensor being in a non-reading state from an initial position to a first position that is determined in advance as a standby position for starting detection of edges of the first original, a first preliminary scanning process of causing the reading sensor to execute a first reading operation for detecting edges of the original while causing the reading sensor to move from the first position by a predetermined distance in the first direction to detect edges of the original, when, in the first preliminary scanning process, an edge of the original in the first direction and an edge of the original in a second direction orthogonal to the first direction are detected, or when, in the first preliminary scanning process, neither the edge of the original in the first direction nor the edge of the original in the second direction are detected, a second preliminary scanning process of causing the reading sensor to execute the first reading operation while causing the reading sensor to move toward the initial position to detect the edge of the original in the first direction, when, in the first preliminary scanning process, the edge of the original in the first direction is not detected and the edge of the original in the second direction is detected, a third preliminary scanning process of causing the reading sensor to execute the first reading operation while causing the reading sensor to move in a direction away from the initial position to detect the edge of the original in the first direction, and when, in the second preliminary scanning process or the third preliminary scanning process, the edge of the original in the first direction is detected, a first main scanning process of causing the reading sensor to execute a second reading operation for acquiring a content of the original while causing the reading sensor to move toward the initial position.

According to aspects of the present disclosure, there is further provided a reading method using a reading device including a reading sensor configured to read an original, and a platen on which a first original and a second original longer in a first direction than the first original can be placed. The method includes a moving step of moving the reading sensor being in a non-reading state from an initial position to a first position that is determined in advance as a standby position for starting detection of edges of the first original, a first preliminary scanning step of causing the reading sensor to execute a first reading operation for detecting edges of the original while causing the reading sensor to move from the first position by a predetermined distance in the first direction to detect edges of the original, when, in the first preliminary scanning step, an edge of the original in the first direction and an edge of the original in a second direction orthogonal to the first direction are detected, or when, in the first preliminary scanning step, neither the edge of the original in the first direction nor the edge of the original in the second direction are detected, a second preliminary scanning step of causing the reading sensor to execute the first reading operation while causing the reading sensor to move toward the initial position to detect the edge of the original in the first direction, when, in the first preliminary scanning step, the edge of the original in the first direction is not detected and the edge of the original in the second direction is detected, a third preliminary scanning step of causing the reading sensor to execute the first reading operation while causing the reading sensor to move in a direction away from the initial position to detect the edge of the original in the first direction, and when, in the second preliminary scanning step or the third preliminary scanning step, the edge of the original in the first direction is detected, a first main scanning step of causing the reading sensor to execute a second reading operation for acquiring a content of the original while causing the reading sensor to move toward the initial position.

According to aspects of the present disclosure, there is further provided a non-transitory computer-readable recording medium storing computer-readable instructions configured to, when executed by a controller configured to control a reading device including a reading sensor configured to read an original, and a platen on which a first original and a second original longer in a first direction than the first original can be placed, cause the controller to execute a moving process of moving the reading sensor being in a non-reading state from an initial position to a first position that is determined in advance as a standby position for starting detection of edges of the first original, a first preliminary scanning process of causing the reading sensor to execute a first reading operation for detecting edges of the original while causing the reading sensor to move from the first position by a predetermined distance in the first direction to detect edges of the original, when, in the first preliminary scanning process, an edge of the original in the first direction and an edge of the original in a second direction orthogonal to the first direction are detected, or when, in the first preliminary scanning process, neither the edge of the original in the first direction nor the edge of the original in the second direction are detected, a second preliminary scanning process of causing the reading sensor to execute the first reading operation while causing the reading sensor to move toward the initial position to detect the edge of the original in the first direction, when, in the first preliminary scanning process, the edge of the original in the first direction is not detected and the edge of the original in the second direction is detected, a third preliminary scanning process of causing the reading sensor to execute the first reading operation while causing the reading sensor to move in a direction away from the initial position to detect the edge of the original in the first direction, and when, in the second preliminary scanning process or the third preliminary scanning process, the edge of the original in the first direction is detected, a first main scanning process of causing the reading sensor to execute a second reading operation for acquiring a content of the original while causing the reading sensor to move toward the initial position.

DETAILED DESCRIPTION

Overall Configuration of Scanner

Figure 1A:
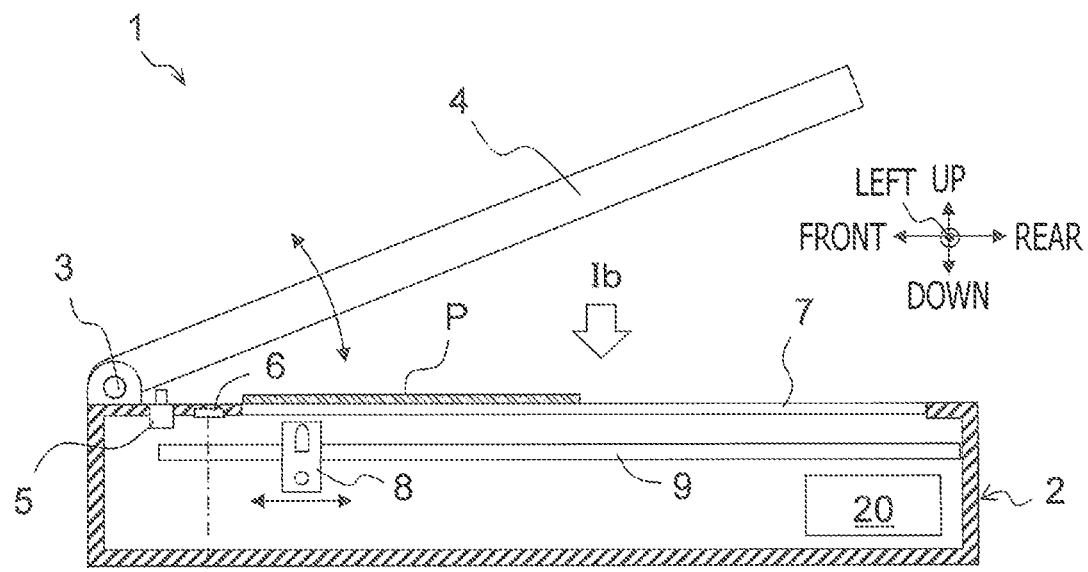
FIG. 1A is a side sectional view illustrating an internal structure of a scanner.
Figure 1B:
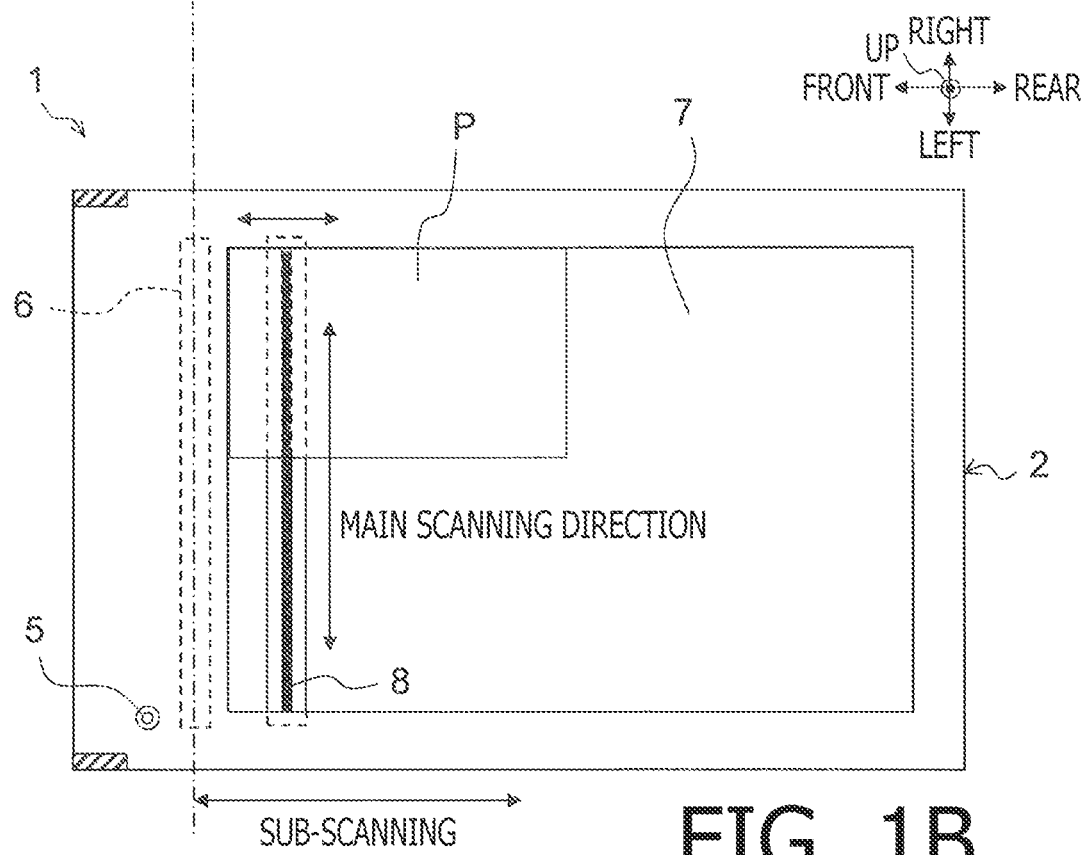
FIG. 1B is a plan view of the scanner in a state where a swingable cover is opened.

FIGS. 1A and 1B illustrates an overall configuration of a scanner 1 according to an embodiment of the present disclosure. FIG. 1A is a side cross-sectional view illustrating an internal structure of the scanner 1, and FIG. 1B is a plan view of the scanner 1 viewed in a direction of an arrow 1b in FIG. 1A in a state where a swingable cover described later is opened. The scanner 1 includes a device main body 2, and the device main body 2 includes a hinge 3, a swingable cover 4, an opening/closing detection switch 5, a white tape 6, a glass plate 7, an image sensor 8, and a guide rail 9. A side of the scanner 1 on which the hinge 3 is provided is defined as a front side, and the opposite side of the scanner 1 is defined as a rear side. A side of the scanner 1 on which the glass plate 7 is provided is defined as an upper side, and the opposite side of the scanner 1 is defined as a lower side.

The device main body 2 is a structure formed in a hollow box shape, and a rectangular glass plate 7 is provided so as to extend horizontally on an upper surface of the device main body 2. The image sensor 8 is provided immediately below the glass plate 7 so as to be movable back and forth along a guide rail 9. The image sensor 8 is a line image reading sensor extending over the entire length of the glass plate 7 in the left-right direction in the drawing, and moves over the entire length of the glass plate 7 in the front-rear direction in the drawing by driving a conventionally-known motor and feed screw and the like. The image sensor 8 can thereby optically read (hereinafter, referred to as "scan") an image on the entire lower surface of an original P placed on an upper surface of the glass plate 7.

The swingable cover 4 is provided to the device main body 2 via a hinge 3 disposed on the front side of the upper surface of the device main body 2, and the entire swingable cover 4 swings about the hinge 3 so that opening and closing movement with respect to the scanner 1 is possible. A user places the original P on the glass plate 7 in a state where the swingable cover 4 is open, and causes the image sensor 8 to scan the lower surface of the original P in the state where the swingable cover 4 closed.

The opening/closing detection switch 5 configured to detect an open/closed state of the swingable cover 4 is provided on the upper surface of the device main body 2. The white tape 6 having a shape extending in the left-right direction in the drawing is attached to an inner surface of an upper wall of the device main body 2 slightly forward of the glass plate 7, and the image sensor 8 can move toward the front side up to a position below the white tape 6.

Control System

Figure 2:
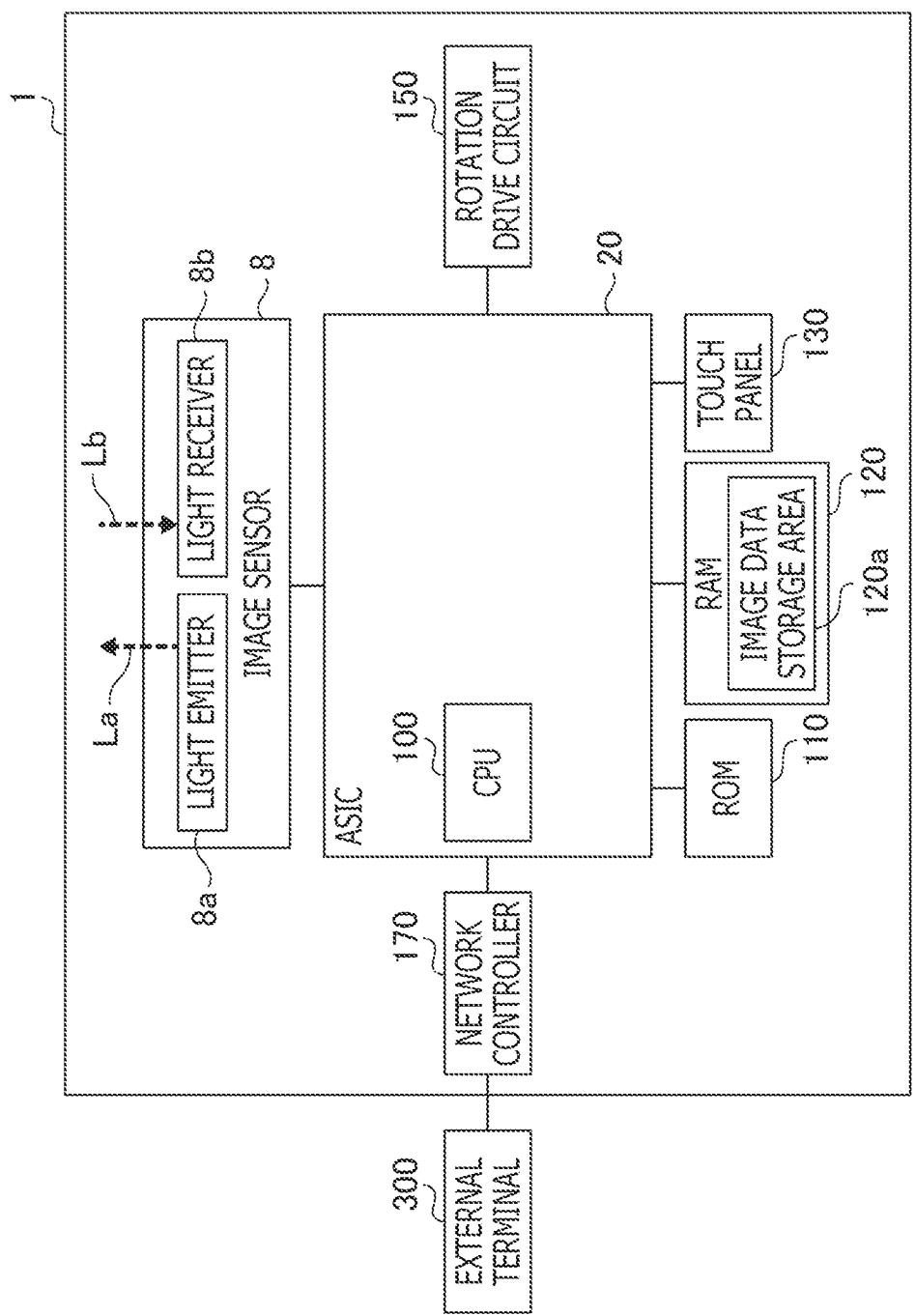
FIG. 2 is a block diagram illustrating a control system of the scanner.

Operation of each part of the scanner 1 including the rotating and stopping of the motor is controlled by an application specific integrated circuit (ASIC) 20. FIG. 2 is a block diagram illustrating a control system of the scanner 1 including the ASIC 20. As shown in FIG. 2, the ASIC 20 includes a CPU 100. Connected to the ASIC 20 are a ROM 110, a RAM 120, a touch panel 130 configured to display desired screen and to be operated by a user, a rotation drive circuit 150, a network controller 170, and the image sensor 8.

The ROM 110 stores various control programs necessary for the scanner 1 to operate, including control programs for executing flowcharts shown in FIGS. 10 to 12 described later. It is noted that the control programs may also be stored in computer-readable recording media including but not limited to RAMs, flash memories, EEPROMs, CD-media, DVD-media, temporary storage, hard disk drives, floppy drives, permanent storage, and the like. The CPU 100 controls each unit in accordance with the programs read from the ROM 110, and executes each flowchart shown in FIGS. 10 to 12 described later. An image data storage area 120*a* is set in a portion of the storage area in the RAM 120. The image data storage area 120*a* stores image data obtained by scanning the original P with the image sensor 8.

The CPU 100 controls the rotation of the motor by outputting a drive control signal to the rotation drive circuit 150 configured to control the rotation of the motor via the ASIC 20. The CPU 100 also controls the network controller 170 via the ASIC 20 to transmit and receive various kinds of information including image data described later to and from the external terminal 300 via wireless or wired network communication.

The image sensor 8 is a reflection-type sensor in which a plurality of sensor elements, each including a light emitter 8*a* configured to emit an emission light La so as to be irradiated at one point and a light receiver 8*b* configured to receive a reflection light Lb of the emission light La emitted from the light emitter 8*a*, are arranged in a line in the left-right direction in FIG. 1B over the entire length of the glass plate 7 in the left-right direction. It should be noted that an intensity of the received light may differ among the plurality of sensor elements due to age deterioration or the like. Therefore, before each scanning operation, it is necessary to cause the image sensor 8 to execute a scanning operation at a position below the white tape 6 where light reflection is uniform, and thereby execute shading correction between intensity data of the received lights detected by the sensor elements.

Standard Sheet Sizes and Positional Relationship

Figure 3:
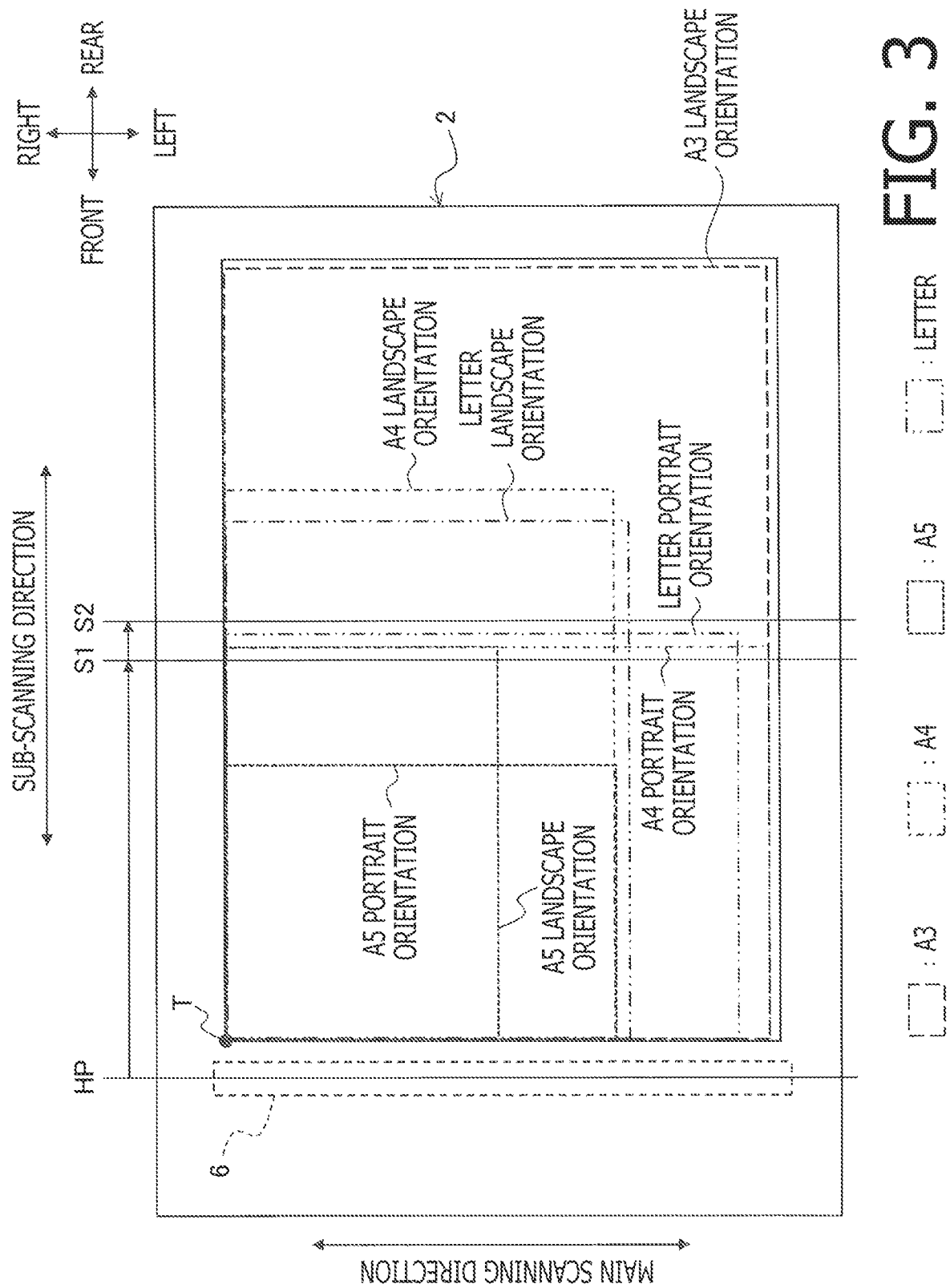
FIG. 3 is a diagram illustrating a positional relationship of originals of respective sheet sizes placed on a glass plate.

The scanner 1 according to the present embodiment is designed to mainly scan the original P having a standard sheet size of A5, A4, A3, or Letter, and when placing the original P on the glass plate 7, the original P is set in one of placement postures illustrated in FIG. 3 which is a view identical to the view illustrated in FIG. 1B. Specifically, in the present embodiment, the rectangular glass plate 7 is formed to be slightly larger than the original P of A3 size in both the longitudinal direction and the width direction thereof, and is disposed in a posture in which the longitudinal direction thereof is parallel to the front-rear direction of the scanner 1. When manually placing the original P on the glass plate 7, a user aligns one of corners of the original P with a placement reference point T which is a front right corner of the glass plate 7, and aligns each side of the original P in parallel with or perpendicular to the front-rear direction or the left-right direction. That is, the user places the original P on the glass plate 7 such that one edge of the original P is aligned at the front edge of the glass plate, while another edge of the original P is aligned at a right edge of the glass plate. The original P of A3 size can be placed only in a landscape orientation in which the longitudinal direction thereof is parallel to the front-rear direction. However, in case of the original P having a sheet size other than A3, the user may arbitrarily select either the landscape orientation or a portrait orientation in which the longitudinal direction of the original P is parallel to the left-right direction.

The standard size of A4 (297 mm×210 mm) is a size obtained by dividing the standard size of A3 (420 mm×297 mm) into two in the longitudinal direction, and the standard size of A5 (210 mm 148×5 mm) is a size obtained by dividing the standard size of A4 into two in the longitudinal direction. The standard size of Letter (279.4 mm×215.9 mm) is slightly shorter in the longitudinal direction and slightly longer in the width direction than the standard size of A4. When the originals P of respective standard sizes are placed on the glass plate 7 in accordance with the above-described placements postures, a positional relationship between the originals P of the above-described placement postures is as shown in FIG. 3, and the reading target areas by the image sensor 8 for respective placement postures are uniquely determined. In the present embodiment, the reading target area is one of seven reading target areas corresponding to an A5 landscape orientation, an A5 portrait orientation, an A4 landscape orientation, an A4 portrait orientation, a Letter landscape orientation, a Letter portrait orientation, and an A3 landscape orientation, respectively.

A rear edge of the reading target area for the A5 landscape orientation and a rear edge of the reading target area for the A4 portrait orientation coincide with each other, and a rear edge of the reading target area for the Letter portrait orientation is located slightly (5.9 mm) on the rear side of the rear edges of the reading target areas for the A5 landscape orientation and the A4 portrait orientation. Slight clearances are formed between a rear edge and a left edge of the reading target area for the A3 landscape orientation and the corresponding edges of the glass plate 7.

Details of Image Sensor

Although the image sensor 8 is not shown in FIG. 3 in order to avoid complexity of the drawing, as described above, the image sensor 8 is a line image reading sensor in which a plurality of sensor elements are arranged in a line over the entire length of the glass plate 7 in the left-right direction. The image sensor 8 can optically scan the image on the entire lower surface of the original P by moving below the glass plate 7 from one side to the other side in the front-rear direction. A direction of one line that can be collectively scanned by the image sensor 8, that is, the extending direction of the image sensor 8 and the left-right direction in the present embodiment, will be referred to as a main scanning direction. The front-rear direction in which the image sensor 8 moves will be referred to as a sub-scanning direction.

Each sensor element of the image sensor 8 has such high sensitivity that a surface region of the original P and a lower surface region of the swingable cover 4 can be distinguished and recognized through the glass plate 7. Therefore, the image sensor 8 can detect the presence or absence of a boundary between the surface region of the original P and the lower surface region of the swingable cover 4, that is, the presence or absence of an edge of the original P in the main scanning direction, based on the difference in the intensities of the received lights between the sensor elements at a predetermined position in the sub-scanning direction. While moving in the sub-scanning direction, the image sensor 8 can detect the position of the boundary between the surface region of the original P and the lower surface region of the swingable cover 4, that is, an edge of the original P in the sub-scanning direction, based on the change in the intensity of the received light for the entire line. The edge detection by the image sensor 8 and the above-described image scanning are different in internal processing. The edge detection can be executed by relatively simpler processing than the image scanning. The simpler processing includes, for example, scanning at the lowest resolution among the reading resolutions that can be set with the image sensor 8.

As described above, it is necessary for the image sensor 8 to execute the shading correction at the position below the white tape 6 every time before executing the scanning operation on the original P. For this reason, in the present embodiment, when opening/closing detection switch 5 detects the change of the state of the swingable cover 4 from the closed state to the open state and it is estimated that the user is placing the original P, the CPU 100 controls the rotation drive circuit 150 to move the image sensor 8 to an initial position HP, which is the position below the white tape 6, and immediately executes the shading correction process. In the present embodiment, a moving speed of the image sensor 8 in the sub-scanning direction when moving directly to a specific position such as the initial position HP, a moving speed of the image sensor 8 in the sub-scanning direction when executing the edge detection, and a moving speed of the image sensor 8 in the sub-scanning direction when executing the image scanning of the original P are assumed to be the same.

First Preliminary Scanning Process

Due to the configuration of the scanner 1 described above, a time required for the entire image scanning operation depends largely on a moving distance in the sub-scanning direction of the image sensor 8 for the image scanning, that is, a length of the original P in the sub-scanning direction. Therefore, in order to shorten the time required for the entire image scanning operation, it is necessary to specify in advance the reading target area of the image sensor 8, that is, the sheet size and placement posture of the original P. When the user designates the sheet size and placement posture of the original P in advance through an input operation on the touch panel 130 or the external terminal 300, the reading target area can be uniquely specified based on the designation.

However, when there is no such designation from the user, it is necessary to separately execute a preliminary scanning process for quickly specifying the sheet size and placement posture of the original P immediately before executing the image scan operation after the original P is placed by the edge detection that can be executed more easily than the image scanning. However, as described above, the image sensor 8 is positioned at the initial position HP slightly on the front side of the glass plate 7 during the placement operation of the original P. Therefore, when the image sensor 8 is moved backward in the sub-scanning direction from the initial position HP while causing the image sensor 8 to execute the edge detection, it is necessary to cause the image sensor 8 to move for the edge detection over the entire length of the original P in the sub-scanning direction, and the time required for the preliminary scanning process becomes long.

Therefore, in the present embodiment, a first preliminary scanning process is preferentially executed for detecting whether the sheet size and placement posture of the original P placed on the glass plate 7 correspond to one of the A5 landscape orientation, the A4 portrait orientation, or the Letter portrait orientation by firstly executing the edge detection on a narrow area where the rear edge of the reading target area for the A5 landscape orientation, the rear edge of the reading target area for the A4 portrait orientation, and the rear edge of the reading target area for the Letter portrait orientation coincide with each other or are close to each other. Specifically, as illustrated in FIG. 3, a position in the sub-scanning direction slightly forward of a position where the rear edge of the reading target area for the original P in the A5 landscape orientation and the rear edge of the reading target area for the original P in the A4 portrait orientation coincide with each other is set as the first start position S1. Further, a position in the sub-scanning direction slightly on the rear side of the rear edge of the reading target area for the Letter portrait orientation is defined as a first end position S2. As the first preliminary scanning process, the image sensor 8 is caused to execute the edge detection on an area between the first start position S1 and the first end position S2. Accurate positions in the sub-scanning direction of the first start position S1 and the first end position S2 may be set such that the image sensor 8 can reliably detect the rear edge of the reading target area for the original P in the A5 landscape orientation, the rear edge of the reading target area for the original P in the A4 portrait orientation, and the rear edge of the reading target area for the original P in the Letter portrait orientation, and such that a distance between the first start position S1 and the first end position S2 is as short as possible.

Figure 4A:
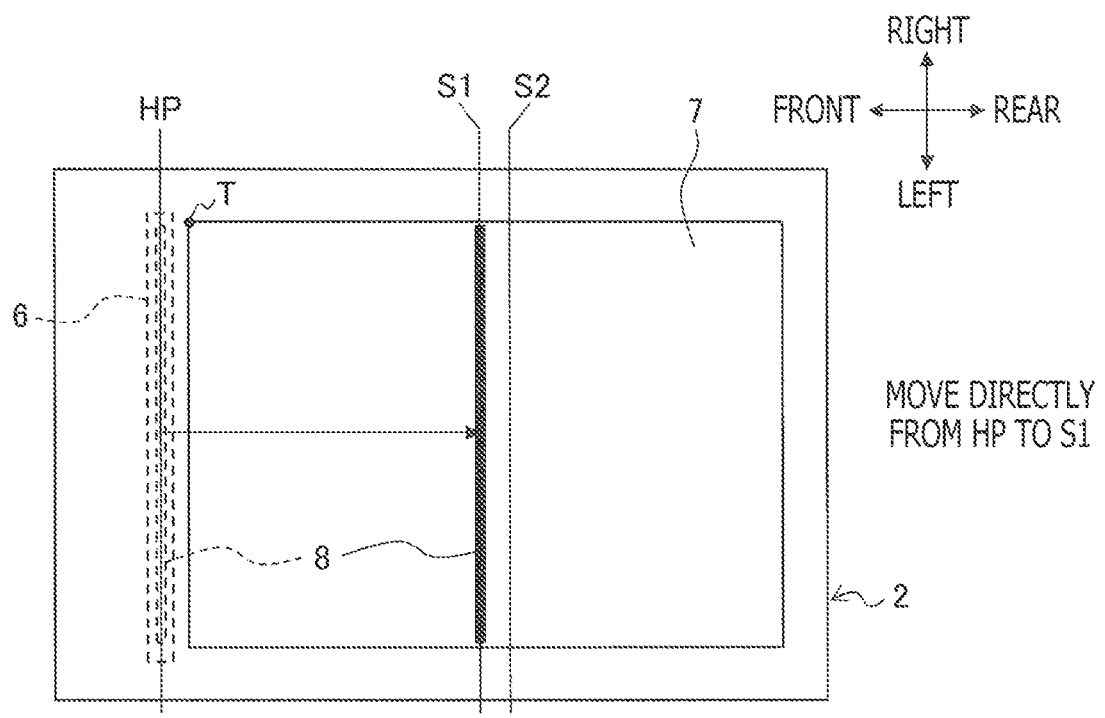
FIG. 4A is a diagram illustrating a direct movement of an image sensor from an initial position to a first start position.
Figure 4B:
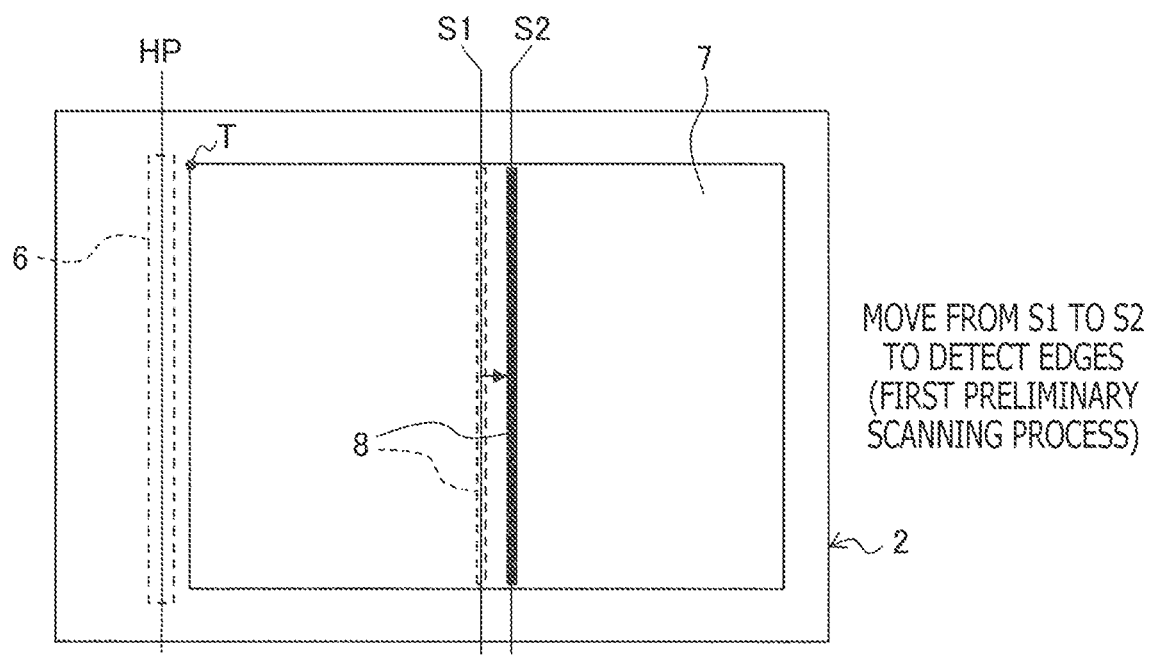
FIG. 4B is a diagram illustrating a movement of the image sensor for an edge detection in a first preliminary scanning process.

The following is a specific process up to the first preliminary scanning process. First, the open state of the swingable cover 4 is detected. Then, the image sensor 8 executes the shading correction at the initial position HP. Then, the image sensor 8 is immediately and directly moved from the initial position HP to the first start position S1 as illustrated in FIG. 4. During the direct movement of the image sensor 8, the image sensor 8 is not caused to execute scanning Thereafter, when the closed state of the swingable cover 4 is detected, it is determined that the original P is placed on the glass plate 7 at that time, and the image sensor 8 is caused to move from the first start position S1 to the first end position S2 for the edge detection as illustrated in FIG. 4 to execute the first preliminary scanning process.

When the image sensor 8 can detect the edges of the original P in both the main scanning direction and the sub-scanning direction by the first preliminary scanning process described above, it can be determined that the reading target area for the placed original P is one of the reading target area for the A5 landscape orientation, the reading target area for the A4 portrait orientation, and the reading target area for the Letter portrait orientation. When the edge of the original P cannot be detected in both the main scanning direction and the sub-scanning direction, it can be determined that the reading target area for the original P is the reading target area for the A5 portrait orientation. When the edge of the original P can be detected in the main scanning direction but the edge of the original P cannot be detected in the sub-scanning direction, it can be determined that the reading target area for the original P is one of the reading target area for the A4 landscape orientation, the reading target area for the Letter landscape orientation, and the reading target area for the A3 landscape orientation. In summary, when the edge in the main scanning direction is detected and the edge in the sub-scanning direction is not detected, it can be determined that the reading target area for the original P is one of the reading target area for the A4 landscape orientation, the reading target area for the Letter landscape orientation, and the reading target area for the A3 landscape orientation. That is, it can be determined that the rear edge of the reading target area is on the rear side of the first end position S2. In the other cases, it can be determined that the reading target area for the original P is one of the reading target area for the A5 portrait orientation, the reading target area for the A5 landscape orientation, the reading target area for the A4 portrait orientation, and the reading target area for the Letter portrait orientation. That is, it can be determined that the rear edge of the reading target area is on the front side of the first end position S2.

The above-described first preliminary scanning process is invariably executed in synchronization with the closing operation of the swingable cover 4, and after the first preliminary scanning process is executed, the image sensor 8 is positioned at the first end position S2. However, there is also a case where the user separately executes an operation of designating the sheet size and placement posture of the original P during a period from the execution of the first preliminary scanning process to a receipt of an instruction to start the subsequent image scanning. In this case, the detection result of the executed first preliminary scanning process is not used, and the image sensor 8 is moved directly to the rear edge of the reading target area corresponding to the designated paper size and placement posture.

Figure 5A:
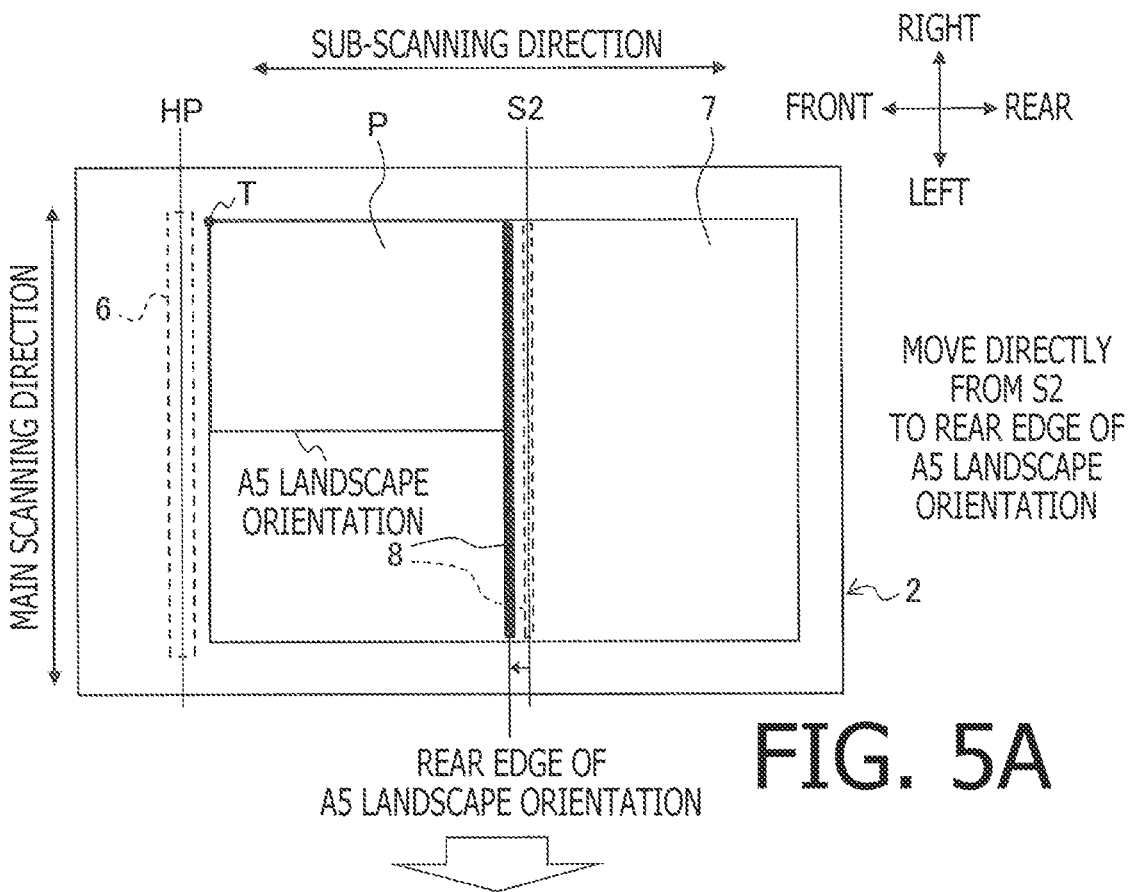
FIG. 5A is a diagram illustrating the direct movement of the image sensor toward the front side from the first start position to a rear edge of a designated sheet size.
Figure 5B:
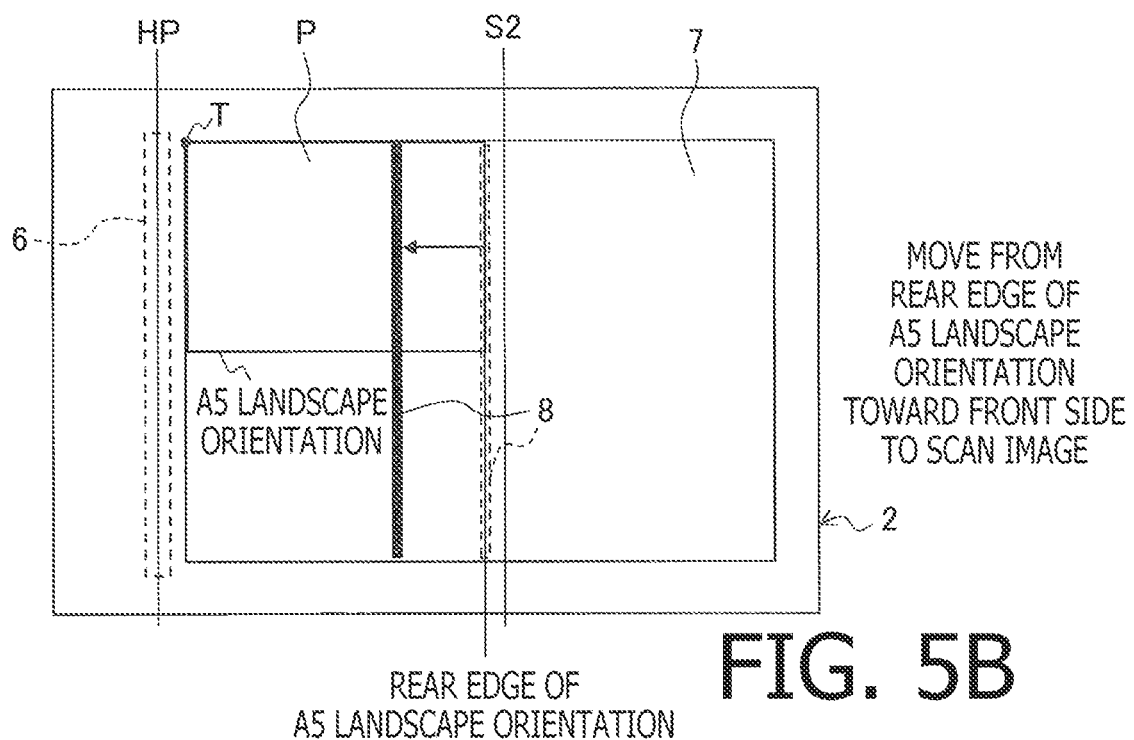
FIG. 5B is a diagram illustrating a movement of the image sensor for an image scanning with respect to the reading target area of the designated sheet size.

At this time, when the rear edge of the reading target area is positioned on the front side of the first end position S2 as in the case where the A5 landscape orientation is designated, as illustrated in FIG. 5A, the image sensor 8 moves directly from the first end position S2 toward the front side to the rear edge of the reading target area. After the image sensor 8 arrives at the rear edge of the reading target area, as illustrated in FIG. 5B, the image sensor 8 executes the image scanning while continuing to move toward the front side, that is, toward the initial position HP. Even in this case, the required time is equivalent to that in a case where the image sensor 8 starts to move from the initial position HP first and then moves to the rear edge of the reading target area for the A5 landscape orientation for the image scanning.

Figure 6A:
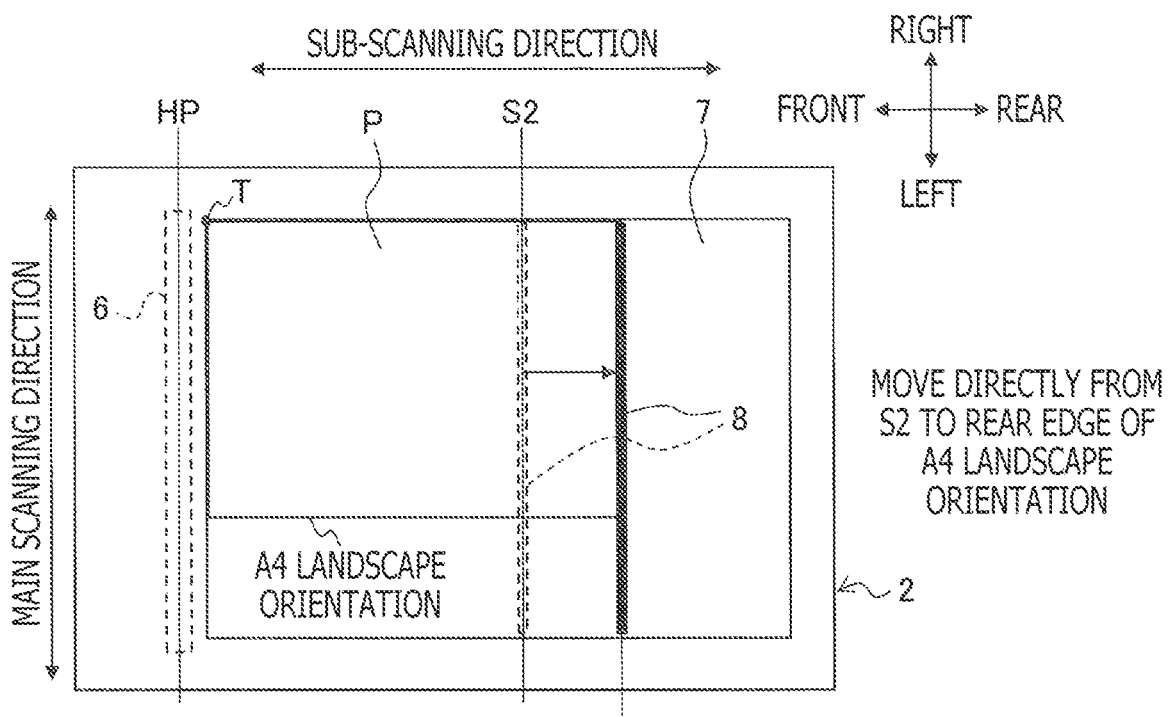
FIG. 6A is a diagram illustrating the direct movement of the image sensor toward the rear side from the first start position to the rear edge of the designated sheet size.
Figure 6B:
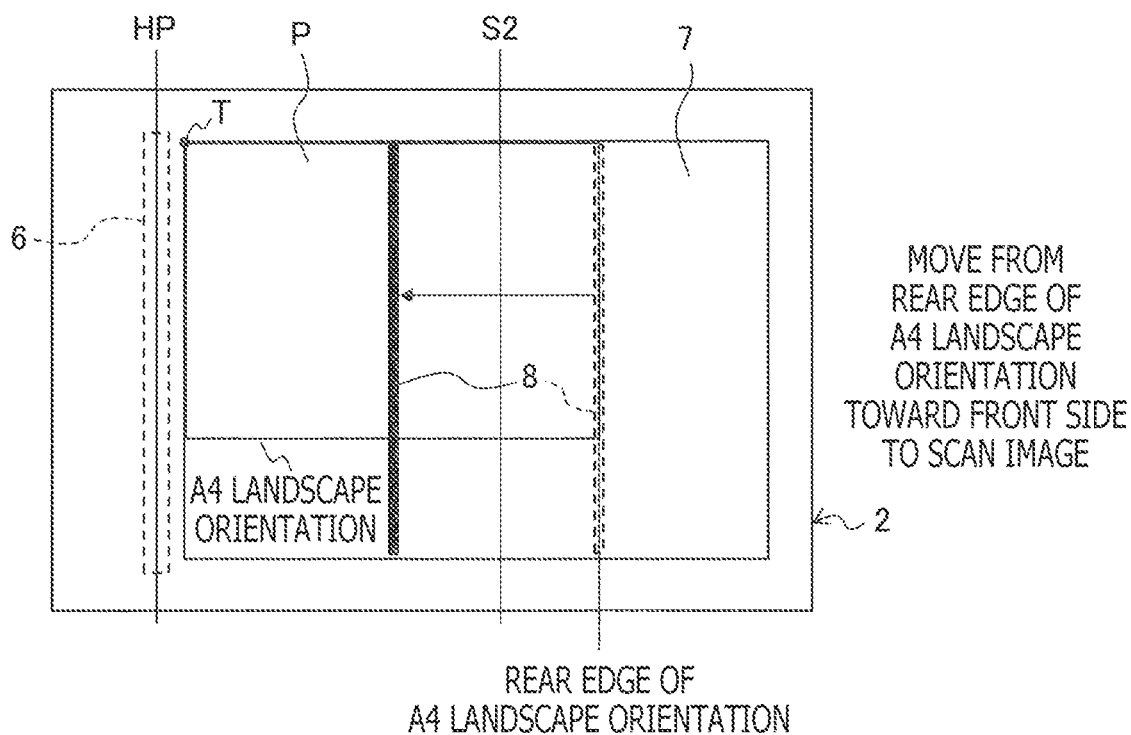
FIG. 6B is a diagram illustrating a movement of the image sensor for the image scanning with respect to the reading target area of the designated sheet size.

When the rear edge of the reading target area is positioned on the rear side of the first end position S2 such as a case where the A4 landscape orientation is designated, as illustrated in FIG. 6A, the image sensor 8 moves directly from the first end position S2 toward the rear side to the rear edge of the reading target area. After the image sensor 8 arrives at the rear edge of the reading target area, as illustrated in FIG. 6B, the image sensor 8 executes the image scanning while moving toward the front side, that is, while moving toward the initial position HP. In this case, the required time is longer than that in a case where the image sensor 8 starts moving from the initial position HP to the rear edge of the reading target area for the A4 landscape orientation for the image scanning, but the increased time is relatively short.

Second and Third Preliminary Scanning Processes

As described above, by the first preliminary scanning process, it is possible to automatically determine whether the rear edge of the reading target area for the original P of which the sheet size and placement posture are not designated is located on the front side or the rear side of the first end position S2.

Figure 7A:
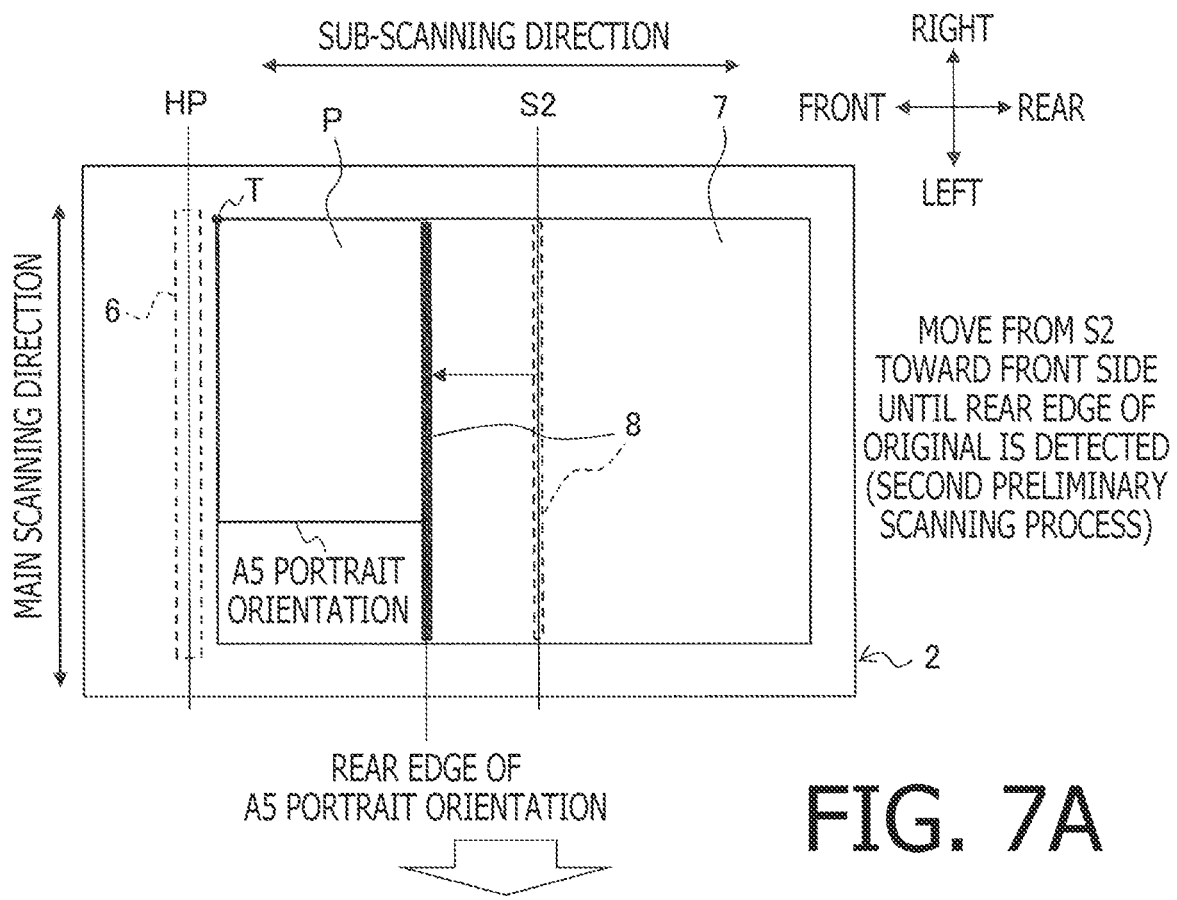
FIG. 7A is a diagram illustrating a movement of the image sensor for the edge detection in a second preliminary scanning process.
Figure 7B:
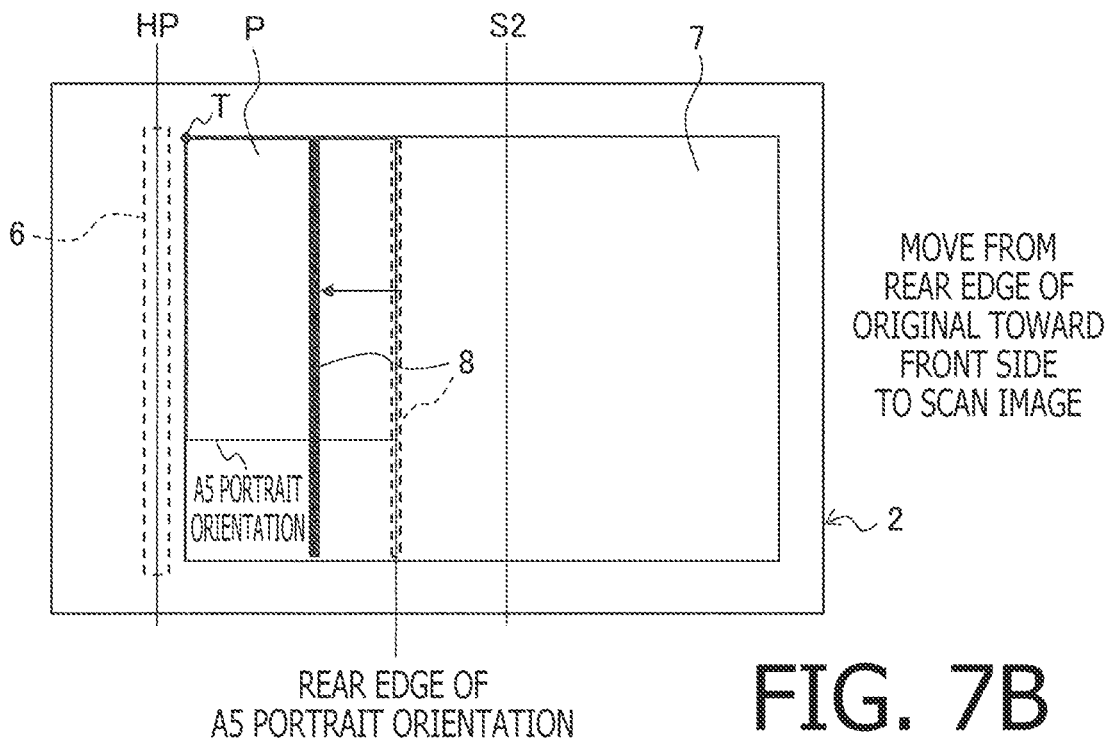
FIG. 7B is a diagram illustrating a movement of the image sensor for the image scanning with respect to the reading target area of the original.

In the present embodiment, when it is determined by the first preliminary scanning process that the rear edge of the reading target area is positioned on the front side of the first end position S2 such as the case of the A5 portrait orientation, a second preliminary scanning process such as a process illustrated in FIG. 7A is executed. Specifically, the image sensor 8 moves from the first end position S2 toward the front side for the edge detection until the image sensor 8 detects the rear edge of the original P. A time required for this second preliminary scanning process is shorter than a time required for the image sensor 8 to move for the edge detection from the initial position HP to the rear edge of the reading target area for the A5 portrait orientation. After arriving at the rear edge in the second preliminary scanning process, as illustrated in FIG. 7B, the image sensor 8 continues to move toward the front side, that is, toward the initial position HP, while executing the image scanning.

Figure 8A:
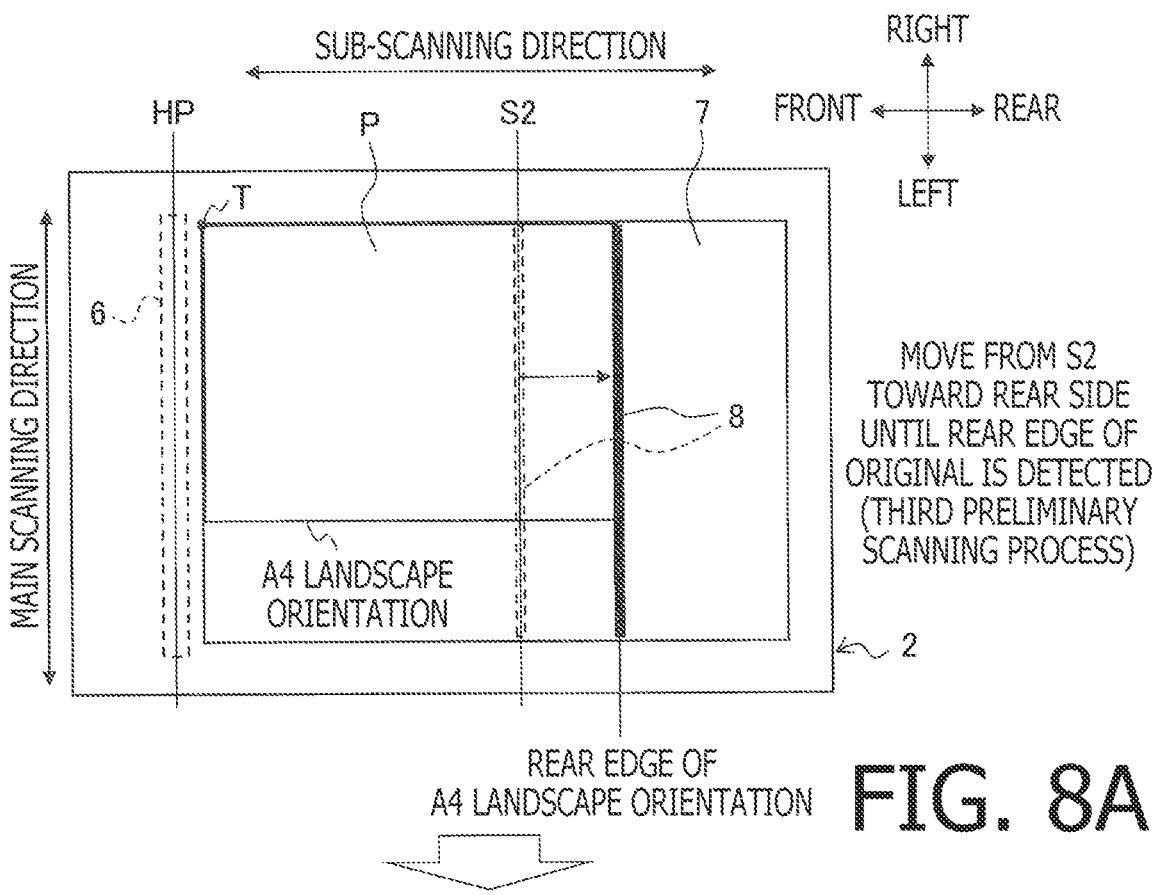
FIG. 8A is a diagram illustrating a movement of the image sensor for the edge detection in a third preliminary scanning process.
Figure 8B:
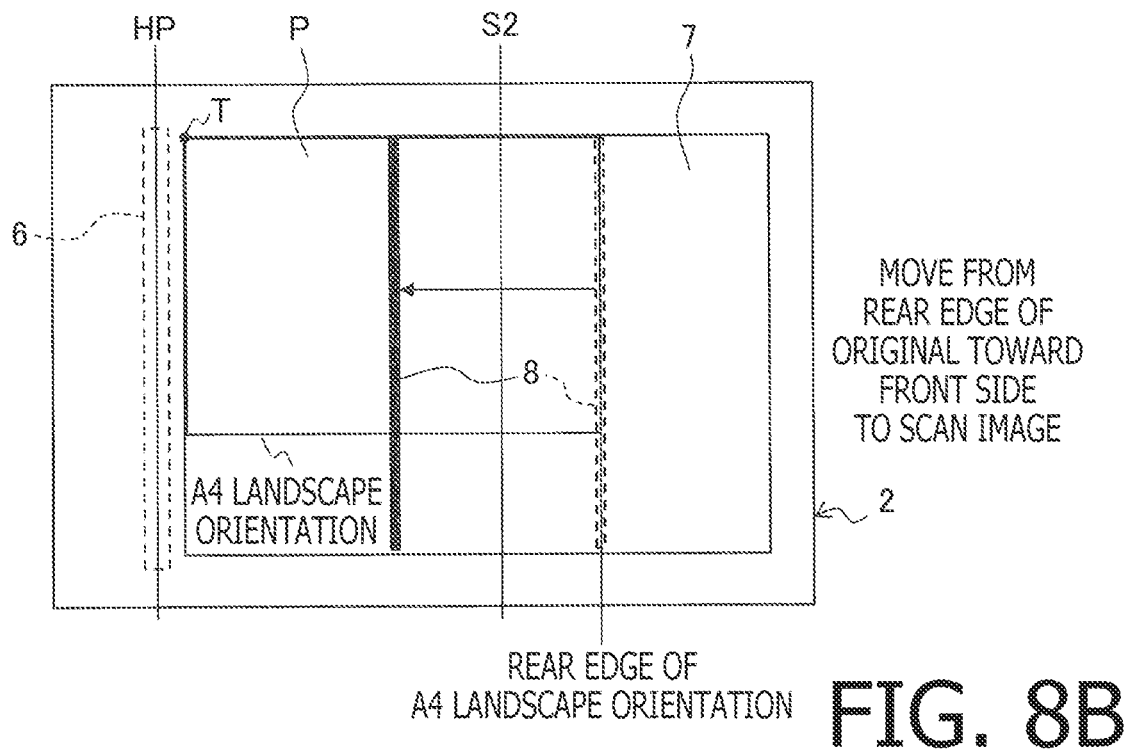
FIG. 8B is a diagram illustrating a movement of the image sensor for the image scanning with respect to the reading target area of the original.

When it is determined by the first preliminary scanning process that the rear edge of the reading target area is positioned on the rear side of the first end position S2 as in, for example, the case of the A4 landscape orientation, a third preliminary scanning process illustrated in FIG. 8A is executed. Specifically, the image sensor 8 moves from the first end position S2 toward the rear side for the edge detection until the rear edge of the original P is detected. A time required for this third preliminary scanning process is remarkably shorter than a time required for the image sensor 8 to move for the edge detection from the initial position HP to the rear edge of the reading target area for the A4 landscape orientation. After arriving at the rear edge in the third preliminary scanning process, as illustrated in FIG. 8B, the image sensor 8 execute the image scanning while moving toward the front side, that is, toward the initial position HP.

Reverse Order Arranging Process of Line Scan Data

Figure 9A:
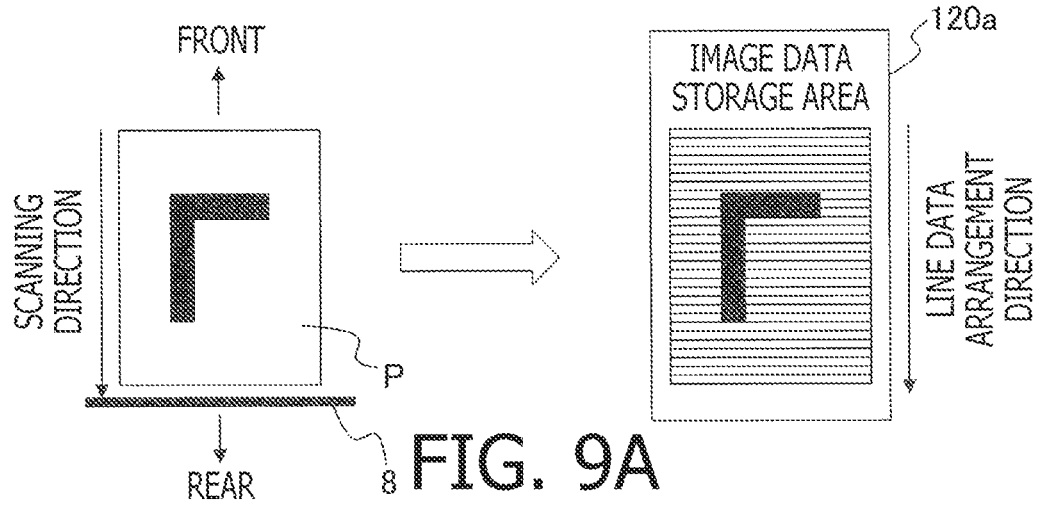
FIG. 9A is a diagram for explaining a reverse order arranging process of line scan data.

In the image scanning illustrated in FIGS. 5B, 6B, 7B, and 8B, since the image sensor 8 moves from the rear edge toward the front edge of the reading target area to execute the image scanning, the following inconvenience occurs. Normally, as illustrated in FIG. 9A, the image sensor 8 repeatedly executes one line scan in the main scanning direction while moving from the front side to the rear side in the sub-scanning direction. Then, by arranging and storing the pieces of acquired line scan data in the image data storage area 120a in a line data arrangement direction corresponding to the acquisition order, it is possible to store the pieces of line scan data as image data representing an image of which orientations in the up-down direction and in the left-right direction are the same as those of the image on the original P.

Figure 9B:
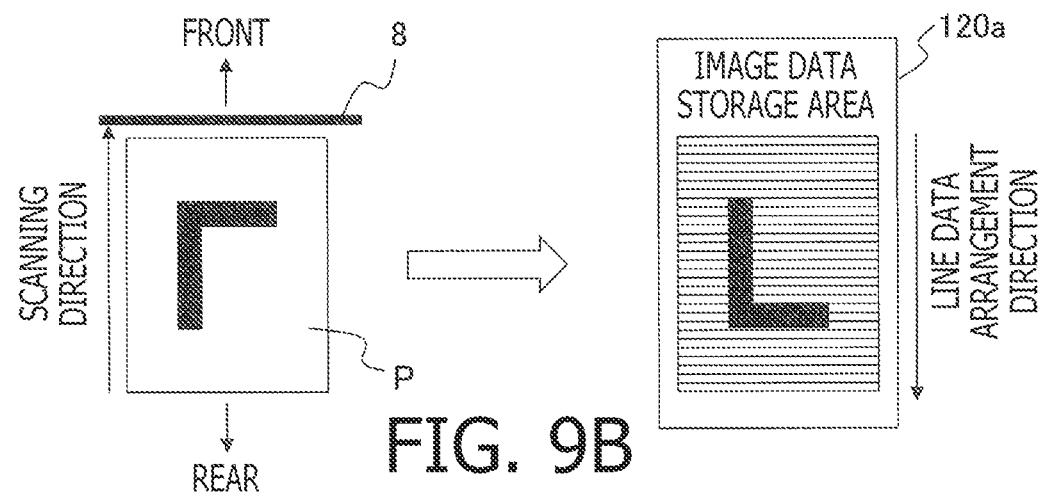
FIG. 9B is a diagram for explaining the reverse order arranging process of the line scan data.

However, as shown in FIG. 9B, if the image sensor 8 is moved in the direction opposite to the normal direction to execute the image scanning and the pieces of acquired line scan data are stored in the image data storage area 120a in the order of acquisition without changing the line data arrangement direction, the pieces of line scan data will be stored as image data representing an image obtained by inverting the image on the original P in the up-down direction.

Figure 9C:
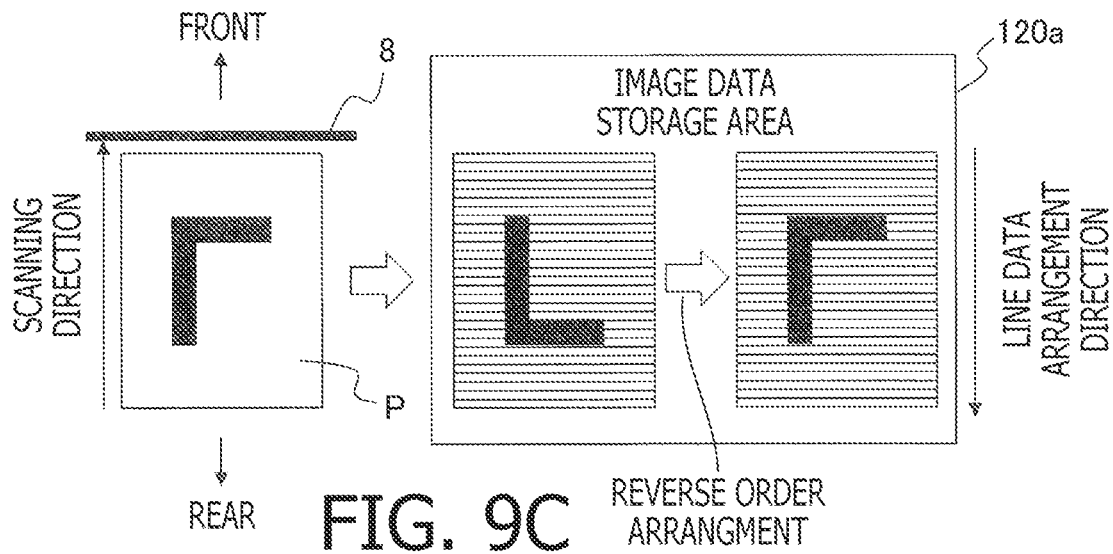
FIG. 9C is a diagram for explaining the reverse order arranging process of the line scan data.

In contrast, in the present embodiment, as illustrated in FIG. 9C, the pieces of line scan data acquired by executing the image scanning while moving in the direction opposite to the normal direction are temporarily stored in a buffer area in the order of acquisition, and thereafter, the pieces of line scan data are stored in the image data storage area 120a by a reverse order arranging process of rearranging the pieces of line scan data in an order opposite to the order of acquisition. As a result, the pieces of line scan data can be stored as image data representing an image of which orientations in the up-down direction and in the left-right direction are the same as those of the image on the original P. It should be noted that the line data arrangement direction may be changed to a direction opposite to the normal direction when acquiring the pieces of line scan data and storing the same in the image data storage area 120a.

Control Procedure

As an example of control for realizing the above-described method, a control procedure executed by the CPU 100 will be described with reference to flowcharts illustrated in FIGS. 10 to 12. A control procedure for the original setting process illustrated in FIG. 10 is started when the original P is not placed on the glass plate 7 and the swingable cover 4 is in the closed state.

First, in S5, it is determined whether the swingable cover 4 is in the open state using the opening/closing detection switch 5. The CPU 100 stands by while it is determined that the swingable cover 4 is in the closed state, and when it is determined that the swingable cover 4 is in the open state, the process proceeds to S10.

In S10, it is determined whether the image sensor 8 is at the initial position HP. When the image sensor 8 is at the initial position HP, the determination result is YES, and the process proceeds to S20 described later. On the other hand, when the image sensor 8 is not at the initial position HP, the determination is NO, and the process proceeds to S15.

In S15, the rotation drive circuit 150 is controlled to move the image sensor 8 directly to the initial position HP.

Next, in S20, the image sensor 8 is caused to execute a scanning operation on the white tape 6 at the initial position HP, thereby executing the shading correction between the intensities of light detected by the sensor elements.

Thereafter, in S25, the rotation drive circuit 150 is controlled to move the image sensor 8 directly to the first start position S1.

Then, in S30, it is determined whether the swingable cover 4 is in the closed state using the opening/closing detection switch 5. The CPU 100 stands by while it is determined that the swingable cover 4 is in the open state, and when it is determined that the swingable cover 4 is in the closed state, the process proceeds to the S35.

In the S35, the first preliminary scanning process of moving the image sensor 8 from the first start position S1 to the first end position S2 for the edge detection is executed. Then, this flow ends.

Next, a control procedure for a scanning process illustrated in FIGS. 11 and 12 will be described. The scanning process is started when a start of the image scanning is instructed by a user through a pressing operation of a conventionally-known start button after the execution of the original setting process.

First, in S105, it is determined whether there has been an input designating the sheet size and placement posture of the original P from the user through the touch panel 130 or the external terminal 300. In a case where there has been the input designating the sheet size and placement posture, the determination result is YES, and the process proceeds to S110.

In S110, it is determined whether the rear edge of the reading target area corresponding to the designated sheet size and placement posture is on the rear side of the first end position S2. When the rear edge is on the front side of the first end position S2, the determination result is NO, and the process proceeds to S115.

In S115, the rotation drive circuit 150 is controlled to move the image sensor 8 toward the front side directly to the rear edge of the reading target area (see FIG. 5A). Next, in S120, the image sensor 8 is moved toward the front side while executing the image scanning on the reading target area (see FIG. 5B).

Thereafter, in S125, the pieces of acquired line scan data are arranged in the reverse order and stored in the image data storage area 120a. Then, this flow ends.

On the other hand, in S110, When the rear edge of the reading target area corresponding to the designated sheet size and placement posture is on the rear side of the first end position S2, the determination result is YES, and the process proceeds to S130.

In S130, the rotation drive circuit 150 is controlled to move the image sensor 8 toward the rear side directly to the rear edge of the reading target area (see FIG. 6A). Next, in S135, the image sensor 8 is moved toward the front side while executing the image scanning on the reading target area (see FIG. 6B). Then, the process proceeds to S125.

On the other hand, in a case where there has been no designation of the sheet size and placement posture of the original P, the determination result in S105 is NO, and the process proceeds to S140.

In S140, it is determined whether the edge in the main scanning direction is detected and the edge in the sub-scanning direction is not detected based on the reading result in the first preliminary scanning process in S35. In other words, it is determined on which of the front side and the rear side of the first end position S2 the rear edge of the reading target area for the original P for which the sheet size and placement posture are not designated is positioned. When the edges in both the main scanning direction and the sub-scanning direction are detected, or when no edge is detected in both the main scanning direction and the sub-scanning direction, in other words, when it is determined that the rear edge of the reading target region is positioned in front of the first end position S2, the determination result in S140 is NO, and the process proceeds to S145.

In S145, the second preliminary scanning process of controlling the rotation drive circuit 150 to move the image sensor 8 toward the front side while causing the image sensor 8 to detect the rear edge of the original P (see FIG. 7A) is executed. The movement of the image sensor 8 is continued until it is determined in S150 that the rear edge is detected, and when it is determined that the rear edge is detected, the reading target area is determined based on the detected edge, and the process proceeds to S155. In S155, the image sensor 8 is continuously moved toward the front side while causing the image sensor 8 to execute the image scanning on the reading target area for the original P (see FIG. 7B). Then, the process proceeds to S125.

On the other hand, when the edge in the main scanning direction is detected and the edge in the sub-scanning direction is not detected, in other words, when the rear edge of the reading target area is on the rear side of the first end position S2, the determination result in S140 is YES, and the process proceeds to S160.

In S160, the third preliminary scanning process of controlling the rotation drive circuit 150 to move the image sensor 8 toward the rear side while causing the image sensor 8 to detect the rear edge of the original P (see FIG. 8A) is executed. The movement of the image sensor 8 is continued until it is determined in S165 that the rear edge is detected, and when it is determined that the rear edge is detected, the reading target area is determined based on the detected edge, and the process proceeds to S170. In S170, the movement of the image sensor 8 toward the rear side is stopped. Then, in S175, the image sensor 8 is moved toward the front side while causing the image sensor 8 to execute the image scanning on the reading target area for the original P (see FIG. 8B). Then, the process proceeds to S125.

Effects of Embodiment

As described above, in the scanner 1 of the present embodiment, the originals P of the A5 portrait orientation, the A5 landscape orientation, the A4 portrait orientation, and the Letter portrait orientation, and the originals P of the A4 landscape orientation, the Letter landscape orientation, and the A3 landscape orientation whose sizes in the sub-scanning direction are larger than those of the former originals P, can be placed on the glass plate 7. In a state in which the original P is placed on the glass plate 7, the CPU 100 executes the process of S25 and the process of S35. In the process of S25, the image sensor 8 moves from the initial position HP to the first start position S1 without executing the scanning operation. The first start position S1 is a position determined in advance as a standby position for starting the detection of the edges of the original P of the A5 landscape orientation, the A4 portrait orientation, and the Letter portrait orientation. In the first preliminary scanning process of the S35, the image sensor 8 executes an edge detection operation for detecting the edges of the original P while moving from the first start position S1 by a predetermined distance in the sub-scanning direction.

The second preliminary scanning process of S145 or the third preliminary scanning process of S160 is selectively executed in accordance with the detection result of the first preliminary scanning processing of S35. When the edge of the original P in the main scanning direction and the edge of the original P in the sub-scanning direction are detected, or when neither the edge of the original P in the main scanning direction nor the edge of the original P in the sub-scanning direction is detected, the second preliminary scanning process of S145 is executed. In the second preliminary scanning process, the image sensor 8 executes the edge detection operation while moving to the initial position HP to detect the rear edge of the original P. When the edge of the original P in the sub-scanning direction is not detected and the edge of the original P in the main scanning direction is detected, the third preliminary scanning process of S160 is executed. In the third preliminary scanning process, the image sensor 8 executes the edge detection operation while moving in a direction away from the initial position HP to detect the rear edge of the original P in the sub-scanning direction.

Upon determining the reading target area by detecting the rear edge of the original P in the second preliminary scanning process or the third preliminary scanning process, the above-described processes of S155 and S175 are executed. In the processes of S155 and S175, the image sensor 8 moves to the initial position HP while executing an image scanning operation for acquiring the content of the original P.

According to the present embodiment, even if the sheet size and placement posture of the original P are not designated, the second preliminary scanning process or the third preliminary scanning process is selectively executed in accordance with the result of the first preliminary scanning process, and the rear edge of the original P is thereby detected. By this configuration, it is possible to shorten the time required for the entire preliminary scanning regardless of the sheet size and placement posture of an original placed on the glass plate 7.

Further, in the present embodiment, the process of S105 is executed by the CPU 100, and it is determined whether the input to designate the sheet size and placement posture of the original P has been made. The second preliminary scanning process and the third preliminary scanning process described above are executed when it is determined in the process of S105 that the input to designate the sheet size and placement posture has not been made.

In the present embodiment, in a case where the sheet size and placement posture of the original P have not been designated, each process is executed in the order of the moving process of S25, the first preliminary scanning process of S35, the second preliminary scanning process of S145 or the third preliminary scan process of S160, and the first main scanning process S155 or S175. According to the present embodiment, in a case where the sheet size and placement posture of the original P have not been designated, the time required for the entire preliminary scanning can be shortened by reducing the moving amount of the image sensor 8 for detecting the sheet size and placement posture and determining the reading target area.

In the present embodiment, the CPU 100 executes the process of S120 or S135 when it is determined in the process of S105 that the input to designate the sheet size and placement posture has been made. In the process of S120 or S135, the image sensor 8 moves from the first start position S1 to the rear edge in the sub-scanning direction of the reading target area corresponding to the designated sheet size and placement posture, and then executes the scanning operation for acquiring the content of the original P while moving in a direction approaching the initial position HP.

According to the present embodiment, in a case where the sheet size and placement posture of the original P have been designated, the image sensor 8 is moved to the rear edge in the sub-scanning direction of the reading target area for the sheet size and placement posture, and then the process of S120 or S135 is executed. Therefore, it is possible to shorten the time required to determine the reading target area before the image scanning operation.

In the present embodiment, the CPU 100 executes the processes of S5 and S30, executes the moving process of the image sensor 8 in the process of S15 when the swingable cover 4 is opened, and executes the first preliminary scanning process in S35 when the swingable cover 4 is closed. According to the present embodiment, it is possible to shorten the time required to complete the preliminary scanning as compared to a case where the image sensor 8 moves to the first start position S1 after the swingable cover 4 is closed.

Further, in the present embodiment, after the second preliminary scanning process of S145 or the third preliminary scanning process of S160, the determination process of S150 or S165 is executed. In the determination process of S150 or S165, a reading target area to be scanned by the image sensor 8 in the process of S155 or S175 is determined based on the rear edge of the original P detected in the second preliminary scanning process or the third preliminary scanning process. In the process of S155 or S175, the image sensor 8 execute the image scanning operation on the determined reading target area.

According to the present embodiment, the image sensor 8 executes the image scanning on the reading target area determined based on the detection result in the second or third preliminary scanning process, thereby shortening the time required for the image scanning.

In the above description, terms such as "vertical," "parallel," and "flat" are not intended to express their exact meanings. That is, the terms "vertical," "parallel," and "flat surface" mean "substantially vertical," "substantially parallel," and "substantially flat," respectively, in consideration of design and manufacturing tolerances and errors.

In the above description, terms regarding dimension or size in appearance such as "identical," "equal," and "different" are not intended to express their exact meanings. That is, "identical," "equal," and "different" mean "substantially identical," "substantially equal," and "substantially different," respectively, in consideration of design and manufacturing tolerances and errors.

Figure 10:
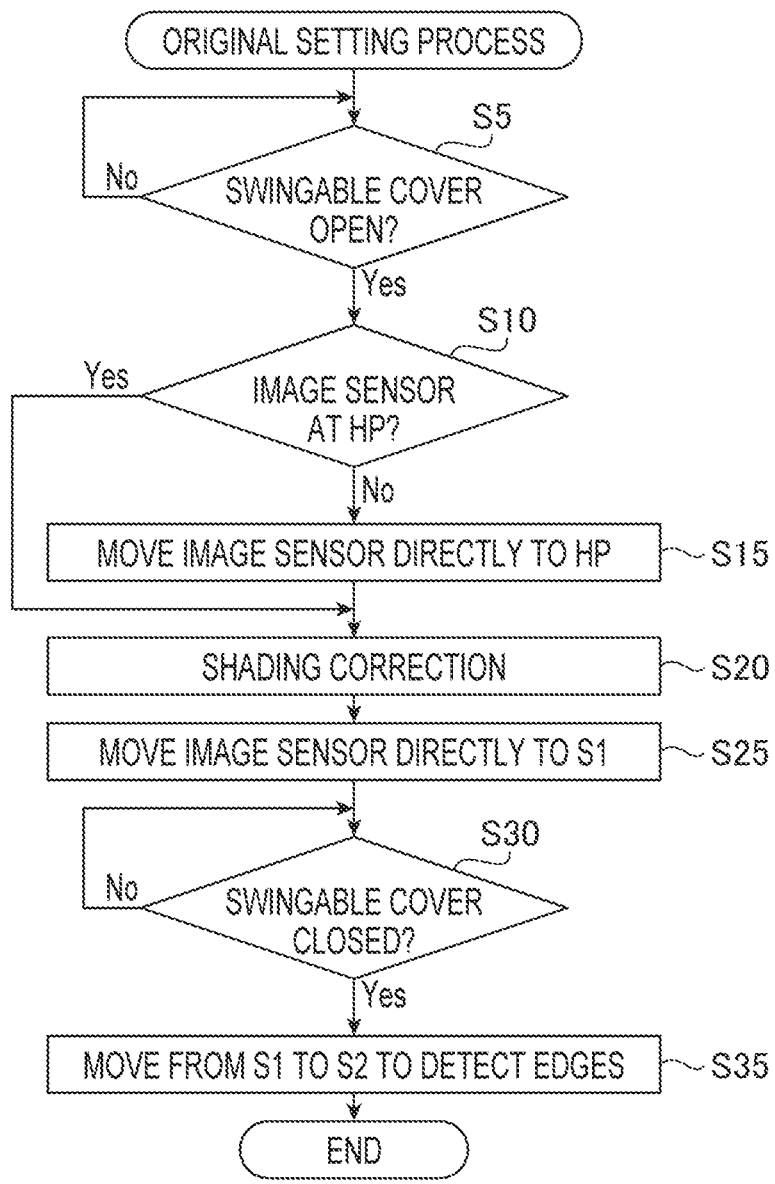
FIG. 10 is a flowchart illustrating an exemplary control procedure of an original setting process.
Figure 11:
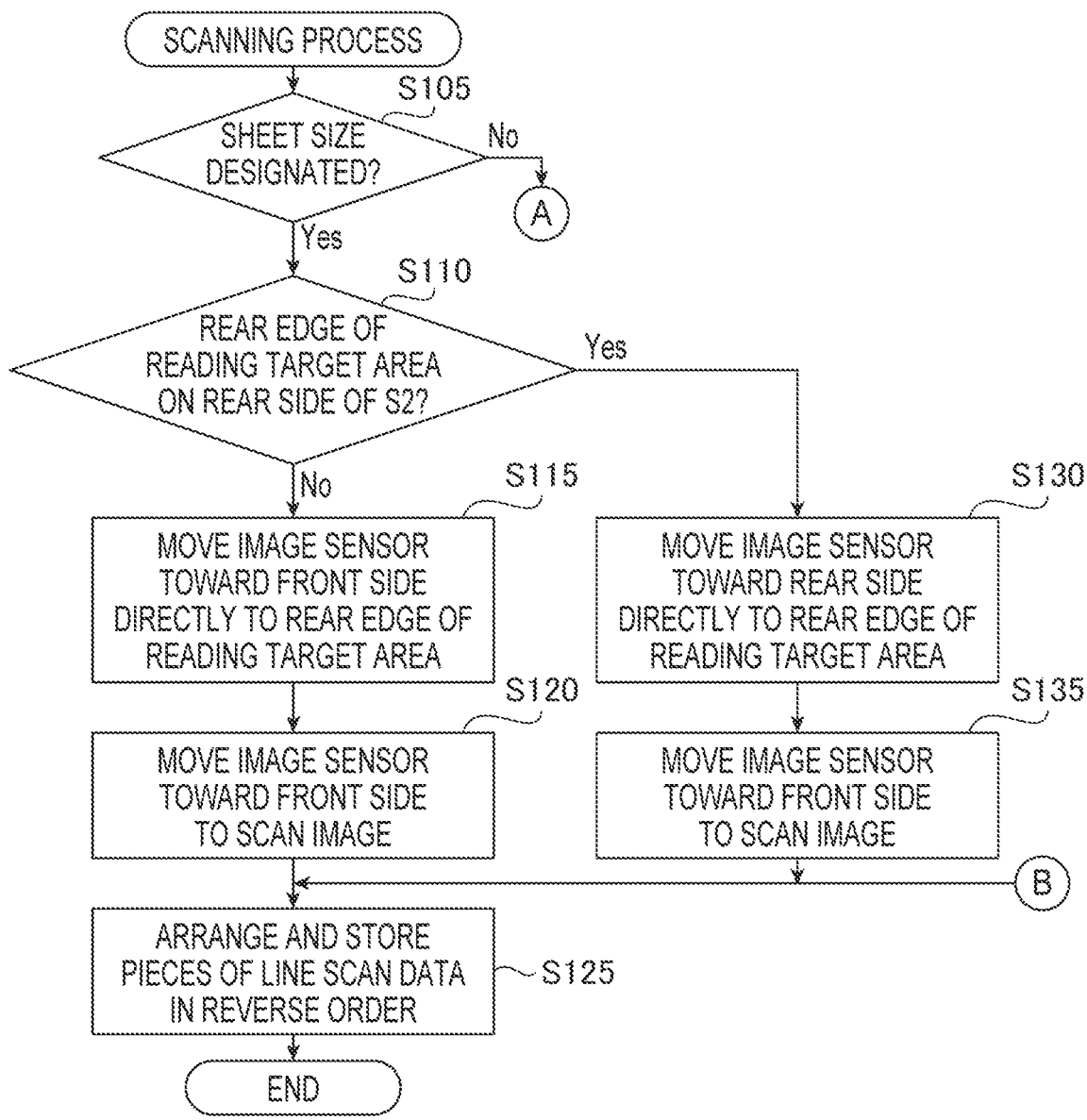
FIG. 11 is a flowchart illustrating an exemplary control procedure of a scanning process.
Figure 12:
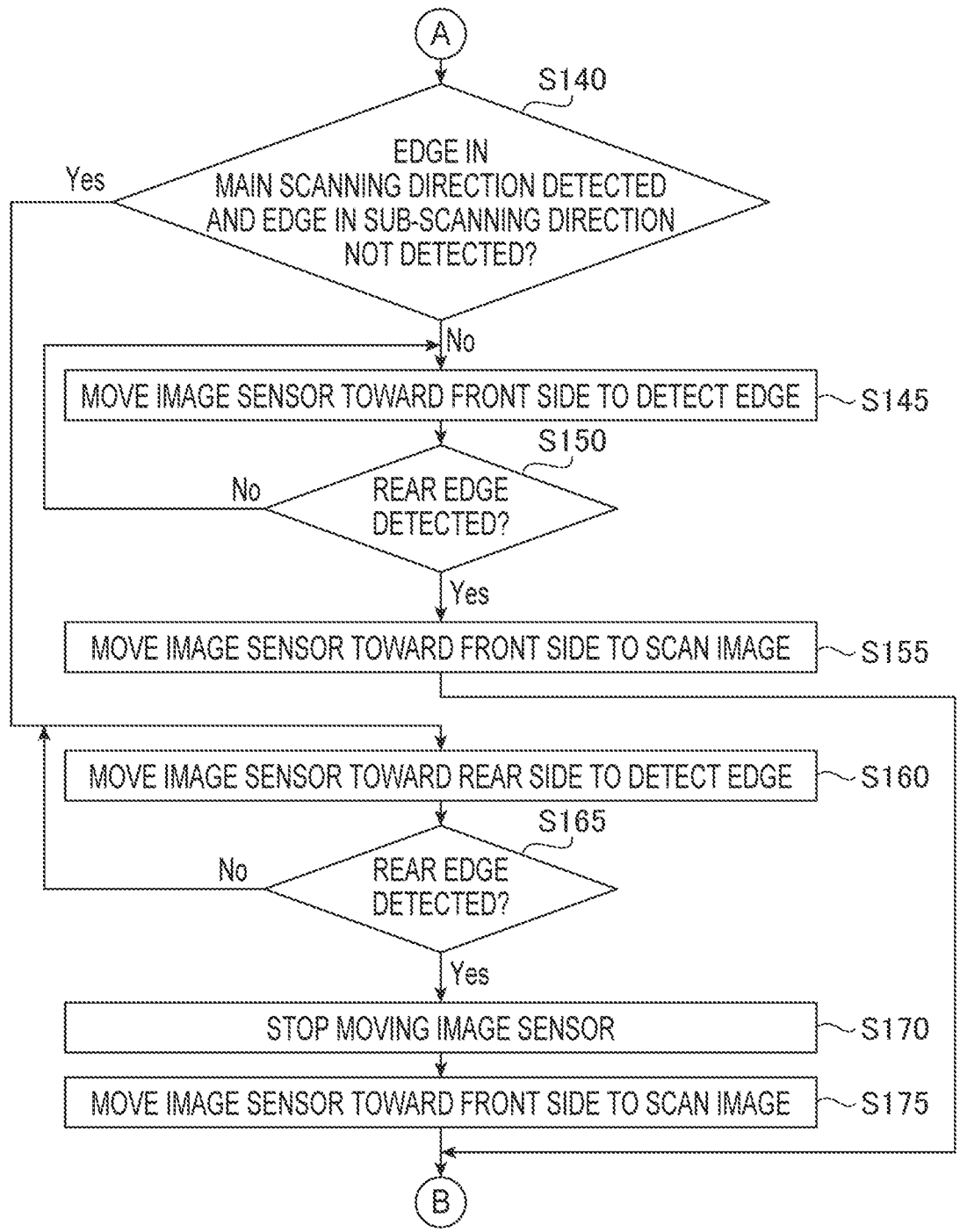
FIG. 12 is a flowchart illustrating an exemplary control procedure of the scanning process.

The flowcharts illustrated in FIGS. 10, 11 and 12 do not limit the aspects of the present disclosure to the procedures illustrated in the above-described flowcharts, and thus addition, deletion, change in order, or the like of the procedures may be made within a range not departing from the scope and technical idea of the present disclosure.

In addition to the methods described above, methods according to the above-described embodiments and variations may be appropriately combined.

In addition, although not illustrated one by one, the aspects of the present disclosure can be carried out with various modification without departing from the scope of the present disclosure.

The scanner 1 in the above-described embodiment is an example of a reading device according to aspects of the present disclosure. The glass plate 7 in the above-described embodiment is an example of a platen according to aspects of the present disclosure. The swingable cover 4 in the above-described embodiment is an example of a cover of the platen according to aspects of the present disclosure. The CPU 100 in the above-described embodiment is an example of a controller according to aspects of the present disclosure. The image sensor 8 in the above-described embodiment is an example of a reading sensor according to aspects of the present disclosure. The originals P respectively corresponding to the reading target areas for the A5 landscape orientation, the A4 portrait orientation, and the Letter portrait orientation in the above-described embodiment are examples of a first original according to aspects of the present disclosure, and the originals P respectively corresponding to the reading target areas for the A4 landscape orientation, the Letter landscape orientation, and the A3 landscape orientation in the above-described embodiment are examples of a second original according to aspects of the present disclosure. The main scanning direction in the above-described embodiment is an example of a second direction according to aspects of the present disclosure. The sub-scanning direction in the above-described embodiment is an example of a first direction according to aspects of the present disclosure. The edge detection by the image sensor 8 in the above-described embodiment is an example of a first reading operation for detecting the edges of the original according to aspects of the present disclosure. The image scanning operation for acquiring the content of the original P by the image sensor 8 in the above-described embodiment is an example of a second reading operation for acquiring a content of the original according to aspects of the present disclosure. The first start position S1 in the above-described embodiment is an example of a standby position and a first position according to aspects of the present disclosure. The sheet size designated by the user in the above-described embodiment is an example of a specific size according to aspects of the present disclosure. The rear edge of the original P in each of the placement postures illustrated in FIG. 5A and FIG. 6B is an example of the second position according to aspects of the present disclosure. The process in S25 in the above-described embodiment is an example of a moving process according to aspects of the present disclosure. The processes in S155 and S175 in the above-described embodiment are examples of a first main scanning process according to aspects of the present disclosure. The process in S105 in the above-described embodiment is an example of a size designation determination process according to aspects of the present disclosure. The processes in S120 and S135 in the above-described embodiment are examples of a second main scanning process according to aspects of the present disclosure. The processes in S5 and S30 in the above-described embodiment are examples of an opening/closing detection process according to aspects of the present disclosure. The processes in S150 and S165 in the above-described embodiment are examples of an area determination process according to aspects of the present disclosure.

What is claimed is:

1. A reading device, comprising:
a reading sensor configured to read an original;
a platen on which the original is to be placed; and
a controller,
wherein the platen is configured such that a first original and a second original longer in a first direction than the first original can be placed, and
wherein the controller is configured to execute:
   a moving process of moving the reading sensor being in a non-reading state from an initial position to a first position that is determined in advance as a standby position for starting detection of edges of the first original;
   a first preliminary scanning process of causing the reading sensor to execute a first reading operation for detecting edges of the original while causing the reading sensor to move from the first position by a predetermined distance in the first direction to detect edges of the original;
   when, in the first preliminary scanning process, an edge of the original in the first direction and an edge of the original in a second direction orthogonal to the first direction are detected, or when, in the first preliminary scanning process, neither the edge of the original in the first direction nor the edge of the original in the second direction are detected, a second preliminary scanning process of causing the reading sensor to execute the first reading operation while causing the reading sensor to move toward the initial position to detect the edge of the original in the first direction;
   when, in the first preliminary scanning process, the edge of the original in the first direction is not detected and the edge of the original in the second direction is detected, a third preliminary scanning process of causing the reading sensor to execute the first reading operation while causing the reading sensor to move in a direction away from the initial position to detect the edge of the original in the first direction; and
   when, in the second preliminary scanning process or the third preliminary scanning process, the edge of the original in the first direction is detected, a first main scanning process of causing the reading sensor to execute a second reading operation for acquiring a content of the original while causing the reading sensor to move toward the initial position.

2. The reading device according to claim 1,
wherein the controller is further configured to execute:
   a size designation determination process of determining whether an input to designate a size of the original is made, and
   when, in the size designation determination process, it is determined that the input to designate the size of the original is not made, the second preliminary scanning process and the third preliminary scanning process.

3. The reading device according to claim 2,
wherein the controller is further configured to execute:
   when, in the size designation determination process, it is determined that a specific size is designated as the size of the original, a second main scanning process of causing the reading sensor to move from the first position to a second position corresponding to an edge of the specific size in the first direction and then causing the reading sensor to execute the second reading operation while causing the reading sensor to move in a direction approaching the initial position.

4. The reading device according to claim 1, further comprising a cover of the platen,
wherein the controller is further configured to execute:
an opening/closing detection process of detecting opening/closing of the cover;
the moving process when opening of the cover is detected in the opening/closing detection process; and
the first preliminary scanning process when closing of the cover is detected in the opening/closing detection process.

5. The reading device according to claim 1,
wherein the controller is further configured to execute:
an area determination process of determining a reading target area to be read by the reading sensor in the first main scanning process based on the edge of the original in the first direction detected in the second preliminary scanning process or the third preliminary scanning process; and
causing, in the first main scanning process, the reading sensor to execute the second reading operation on the reading target area determined in the area determination process.

6. A reading method using a reading device including a reading sensor configured to read an original, and a platen on which a first original and a second original longer in a first direction than the first original can be placed, the method including:
a moving step of moving the reading sensor being in a non-reading state from an initial position to a first position that is determined in advance as a standby position for starting detection of edges of the first original;
a first preliminary scanning step of causing the reading sensor to execute a first reading operation for detecting edges of the original while causing the reading sensor to move from the first position by a predetermined distance in the first direction to detect edges of the original;
when, in the first preliminary scanning step, an edge of the original in the first direction and an edge of the original in a second direction orthogonal to the first direction are detected, or when, in the first preliminary scanning step, neither the edge of the original in the first direction nor the edge of the original in the second direction are detected, a second preliminary scanning step of causing the reading sensor to execute the first reading operation while causing the reading sensor to move toward the initial position to detect the edge of the original in the first direction;
when, in the first preliminary scanning step, the edge of the original in the first direction is not detected and the edge of the original in the second direction is detected, a third preliminary scanning step of causing the reading sensor to execute the first reading operation while causing the reading sensor to move in a direction away from the initial position to detect the edge of the original in the first direction; and
when, in the second preliminary scanning step or the third preliminary scanning step, the edge of the original in the first direction is detected, a first main scanning step of causing the reading sensor to execute a second reading operation for acquiring a content of the original while causing the reading sensor to move toward the initial position.

7. A non-transitory computer-readable recording medium storing computer-readable instructions configured to, when executed by a controller configured to control a reading device including a reading sensor configured to read an original, and a platen on which a first original and a second original longer in a first direction than the first original can be placed, cause the controller to execute:
a moving process of moving the reading sensor being in a non-reading state from an initial position to a first position that is determined in advance as a standby position for starting detection of edges of the first original;
a first preliminary scanning process of causing the reading sensor to execute a first reading operation for detecting edges of the original while causing the reading sensor to move from the first position by a predetermined distance in the first direction to detect edges of the original;
when, in the first preliminary scanning process, an edge of the original in the first direction and an edge of the original in a second direction orthogonal to the first direction are detected, or when, in the first preliminary scanning process, neither the edge of the original in the first direction nor the edge of the original in the second direction are detected, a second preliminary scanning process of causing the reading sensor to execute the first reading operation while causing the reading sensor to move toward the initial position to detect the edge of the original in the first direction;
when, in the first preliminary scanning process, the edge of the original in the first direction is not detected and the edge of the original in the second direction is detected, a third preliminary scanning process of causing the reading sensor to execute the first reading operation while causing the reading sensor to move in a direction away from the initial position to detect the edge of the original in the first direction; and
when, in the second preliminary scanning process or the third preliminary scanning process, the edge of the original in the first direction is detected, a first main scanning process of causing the reading sensor to execute a second reading operation for acquiring a content of the original while causing the reading sensor to move toward the initial position.

* * * * *